Nov. 5, 1957 — H. BUCHANAN — 2,811,866
SAFETY RELEASE HANDLE FOR PARKING BRAKES
Filed July 19, 1954 — 2 Sheets-Sheet 1
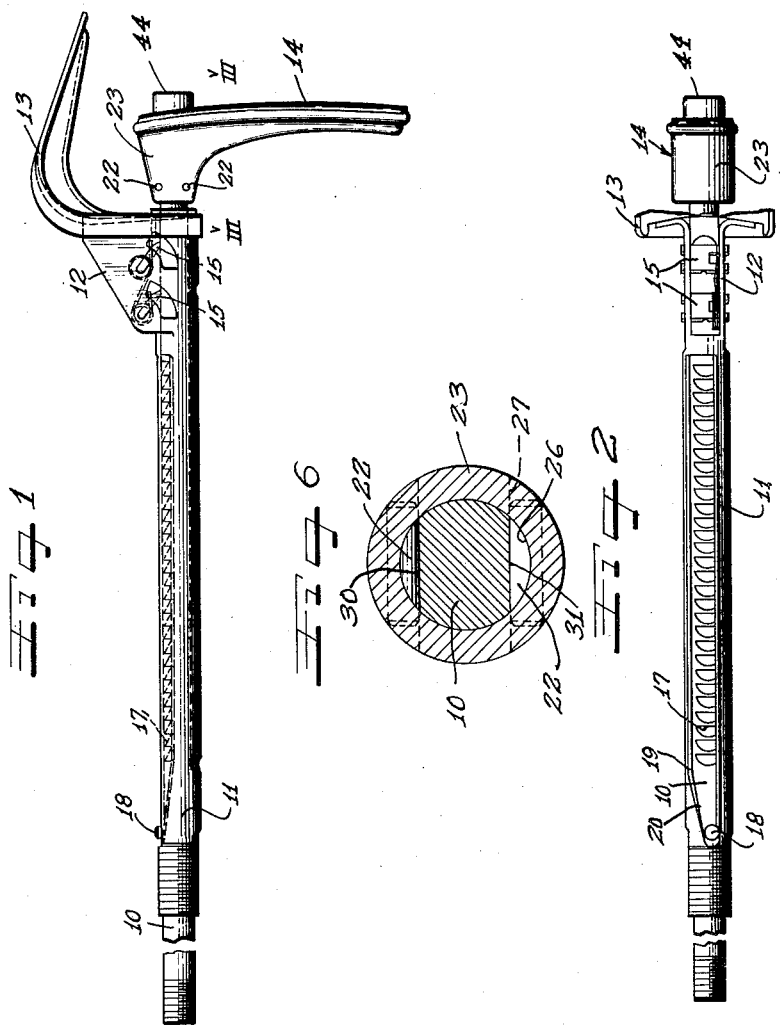
Inventor
Hugh Buchanan Nov. 5, 1957          H. BUCHANAN          2,811,866
SAFETY RELEASE HANDLE FOR PARKING BRAKES
Filed July 19, 1954          2 Sheets-Sheet 2
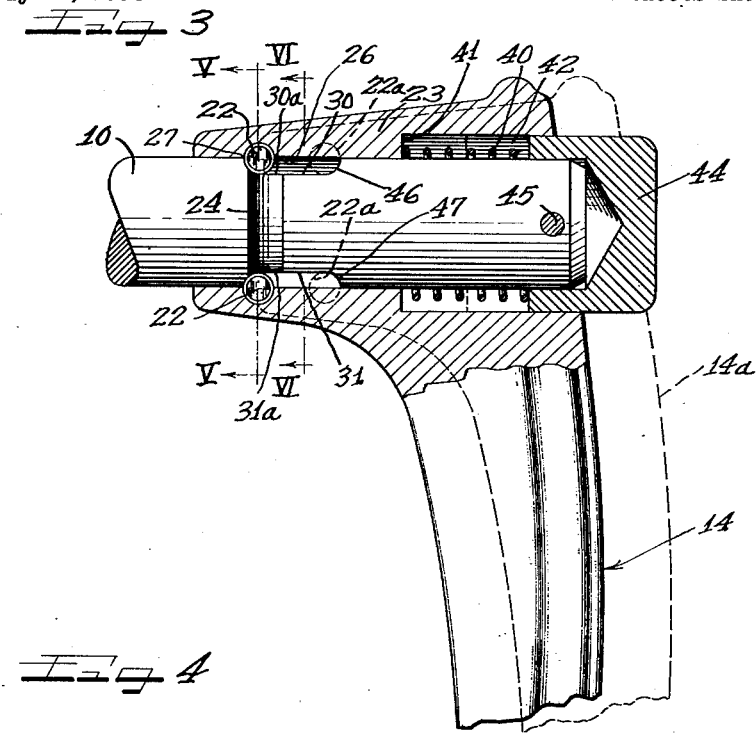
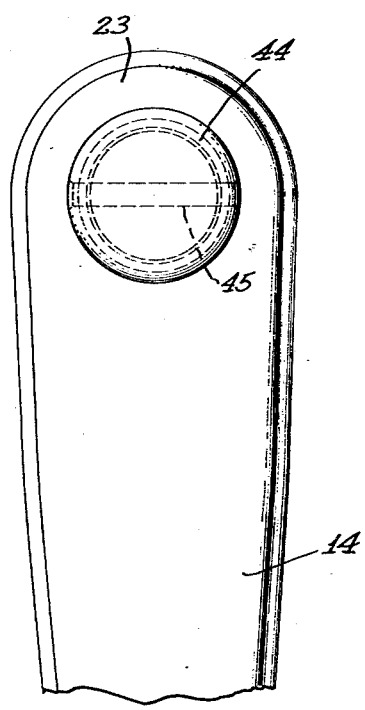
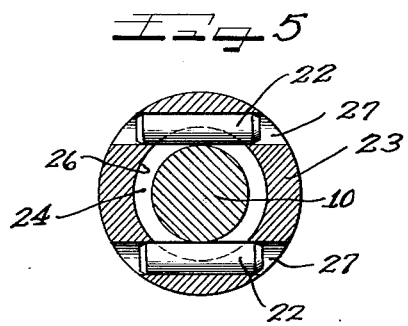
Inventor
Hugh Buchanan

2,811,866
SAFETY RELEASE HANDLE FOR PARKING BRAKES

Hugh Buchanan, Detroit, Mich., assignor, by mesne assignments, to The Bingham-Herbrand Corporation, a corporation of Ohio Application July 19, 1954, Serial No. 444,314

9 Claims. (Cl. 74—503)

The present invention relates to improvements in safety handle constructions for straight pull brake levers and is more particularly concerned with the provision of novel means for avoiding accidental release of the brake lever assembly from a brake setting position.

An object of the present invention is to provide an improved safety handle structure for straight pull brake lever assemblies wherein the handle will swing about the pull rod of the assembly and thus affords a substantial safety factor against accidental release of the brakes.

Another object of the invention is to provide a safety handle for straight pull brake levers wherein manipulation of the handle alone is effective to operate the safety mechanism.

A further object of the invention is to provide a safety handle assembly for straight pull brake levers affording a simple and economical construction embodying a small number of parts that can be produced and assembled by low cost mass production methods of manufacture.

Other objects, features and advantages of the present invention will be readily apparent from the following detailed description of a preferred embodiment thereof taken in conjunction with the accompanying drawings, in which:

Figure 1 is a side elevational view of a straight pull brake lever assembly embodying the invention;

Figure 2 is a top plan view of the brake lever assembly;

Figure 3 is an enlarged fragmentary sectional detail view taken substantially on the line III—III of Figure 1;

Figure 4 is a fragmentary rear elevational view of the structure of Figure 3;

Figure 5 is a cross sectional view taken substantially along the line V—V of Figure 3; and Figure 6 is a cross sectional view taken substantially along the line VI—VI of Figure 3.

The present invention is especially useful with a straight pull brake lever construction such as shown in Figures 1 and 2 including a pull rod 10 reciprocably and rotatably supported by a guide tube housing 11. At its forward end portion the rod 10 is constructed and arranged for attachment to a brake setting cable and the forward end portion of the guide tube 11 is constructed and arranged for attachment to a fixed part of a vehicle such as the dash panel.

At its rear end portion, the tubular housing member 11 has upstanding housing wall portions 12 which are secured to an attachment bracket structure 13 by which the rear end portion of the assembly is attached to a portion of a vehicle such as an automobile instrument panel.

For setting a vehicle brake, such as the emergency or parking brake of the vehicle by use of the straight pull brake lever assembly disclosed, a handle 14 mounted on the rear end portion of the pull rod 10 is manipulated to pull the rod 10 rearwardly until the brake has been set. In the brake setting position of the rod 10 pivoted pawls 15 supported by the housing wall portions 12 engage with ratchet teeth 17 disposed in longitudinal series on the rod 10.

For releasing the brake, the rod 10 is rotated by manipulation of the handle 14 to disengage the ratchet teeth 17 from the pawls 15, and to present a straight, untoothed surface of the pull rod 10 to the pawls. The pull rod 10 can then slide forwardly to release the brake.

Limit upon rotary movement of the rod 10 is controlled by a pin 18 projecting from the rod 10 into a longitudinal slot 19 in the tubular housing 11. When the pin 18 engages one longitudinal edge defining the slot 19 the ratchet teeth 17 are in ratcheting position as shown in Figure 2, while when the pin 18 engages the opposite longitudinal edge the pull rod ratchet teeth are clear of the pawls 15 to accommodate release of the brake. As its forward end portion, the brake release limiting edge defining the slot 19 has a cam surface 20 which positively returns the pin 18 and thus the rod 10 into the ratcheting position.

In order to avoid accidental release of the brake after the pull rod 10 has been pulled rearwardly by means of the handle 14 into a brake setting position, means are provided for effectively disconnecting the handle 14 from the rod 10 until it is desired to release the brake. To this end, a safety disconnect clutch mechanism is provided between the rod and the handle. Said mechanism, in the illustrated embodiment, comprises a pair of abutment members or pins 22 carried by a hub portion 23 of the handle 14, and a cooperating annular groove 24 in the pull rod 10. As best seen in Figure 3, the handle hub portion 23, has a bore 26 extending therethrough with transverse bores 27 which receive pins 22 partially intersecting the bore 26. As illustrated in Figures 3 and 5, the transverse bores 27 intersect with the main longitudinal bore 26 over half their diameter at the maximum point. The reduction in diameter of the pull rod groove 24 relative to the main diameter portion of the pull rod is thus equal to the diameter of the pins 22. It will be seen from Figures 3 and 5 that in the position shown, the handle 14 and pins 22 are free to rotate relative to the pull rod 10 by means of the annular groove 24.

For engaging the handle 14 with the pull rod to turn the pull rod in release of the brake, the pull rod is provided with a pair of flats 30 and 31, Figures 3 and 6, which extend tangentially to the upper and lower bottom wall portions of the groove 24 and extend across the groove a short distance to provide groove flat portions 30a and 31a across which the pins 22 ride to reach the main portions of the flats 30 and 31. The pins 22 are moved onto these flats 30 and 31, for example to the position indicated in dotted outline in Figure 3 at 22a, by retraction of the handle 14 to the position indicated in dash outline at 14a in Figure 3. In this position of the handle, the handle is operative to turn the pull rod to release the brake.

For normally urging the handle to its forward inoperative position, a spring 40 is bottomed against a shoulder 41 provided by an enlarged counterbore 42 extending from the rear of the handle hub portion, the spring encircling the rear end of the pull rod 10 and abutting against a button 44 secured by means of a pin 45 at the rear end of the pull rod 10. This button 44 further serves as a fulcrum against which the thumb of the operator may be placed in pulling the handle 14 rearwardly to engage the clutch mechanism between the pull rod and the handle.

It will be noted that it is advantageous to engage the clutch mechanism by rearward movement of the handle rather than forward movement of the handle, since the brake is to be applied by a rearward pull on the handle and since release of the brake is facilitated by the exertion of a slight rearward pull on the pull rod 10. This rearward pull may be exerted on the pull rod through the handle 14 by means of the shoulders 46 and 47 provided at the ends of the flats 30 and 31 which engage the pins 22 as the handle 14 is pulled rearwardly. In other words, in the preferred embodiment, the pull rod and handle are engageable both for rotary movement and for rearward movement of the pull rod, to simulate the condition with a handle permanently fixed to the pull rod.

It may be noted that the use of an unbalanced type handle such as illustrated, where the center of mass is offset from the axis of the pull rod 10, tends to retain the handle 14 in suitable position for engagement of the pins 22 with the flats 30 and 31. Further, the design of the handle is such that it is normally grasped by the operator in the proper orientation for clutch engagement.

It will be evident from the foregoing description, that to apply the brake, the handle 14 is grasped and pulled rearwardly, during which movement the pins 22 move onto the flats 30 and 31 and against the shoulders 46 and 47; thereafter rearward movement of the handle 14 is transmitted directly to the pull rod 10 to set the brake in a desired position. When the brake is properly set, the handle 14 is released and the spring 40 is operative to shift the handle forwardly on the pull rod 10 until the pins 22 move into registry with the groove 24 and abut against the forward wall of the groove 24. In this condition, any accidental knocking or striking of the handle 14 will simply rotate the handle 14 freely on the axis of the pull rod 10. Further, if a user of the vehicle should hit the handle accidentally, there is relatively little chance of a severe impact since the handle body portion 14 is free to rotate in either direction in response to any laterally applied forces.

When it is desired to release the brake, the thumb of the operator is placed against the button 44 and the handle pulled toward the operator to move the pins 22 into engagement with the flattened portions 30 and 31 of the pull rod, at which time the rod may be rotated by means of the handle for disengaging the brake.

It will be understood that modifications and variations may be effected without departing from the scope of the novel concepts of the present invention.

I claim as my invention:

1. In a straight pull brake lever structure, a reciprocally and rotatably movable member, means for retaining said member in brake setting position against return to brake releasing position, said means being releasable by turning said member, a handle on said member, and clutch means connecting said handle to said member and in disengaged position affording rotation of said handle relative to said member in both directions from a normal angular orientation of said handle but responsive to limited longitudinal movement of the handle relative to said member in said normal angular orientation of said handle for effecting an interlock enabling turning of said member by turning of the handle.

2. In a straight pull brake lever structure, a reciprocally and rotatably movable member, means for retaining said member in brake setting position against return to brake releasing position, said means being releasable by turning said member, a handle on said member, and means connecting said handle to said member and in one position affording rotation of the handle relative to said member through 360° but responsive to limited longitudinal movement of said handle relative to said member for effecting an interlock enabling turning of said member by turning of the handle, said last mentioned means comprising an abutment and a cooperating generally tangentially extending flat longitudinally movable relative to said abutment and preventing arcuate movement of the abutment when aligned therewith while accommodating arcuate movement of the abutment when displaced therefrom.

3. In a brake lever structure, a reciprocally and rotatably movable actuating member, means for retaining said actuating member in brake setting position against return to brake releasing position, said means being releasable by turning said actuating member, a handle member on said actuating member, and clutch means connecting said handle member to said actuating member and in disengaged relation affording relative rotation between said handle member and said actuating member but responsive to limited relative longitudinal movement of said members for effecting an interlock enabling turning of said actuating member by turning of said handle, said clutch means comprising an abutment carried by one of said members, and the other of said members having an arcuate groove allowing arcuate movement of said abutment in disengaged position of said clutch means and having a generally tangentially extending abutment surface disposed in a generally tangential plane for registry with said abutment upon said relative longitudinal movement of said members to effect an interlock between the members.

4. In a brake lever structure, a reciprocally and rotatably movable actuating member, means for retaining said actuating member in brake setting position against return to brake releasing position, said means being releasable by turning said actuating member, a handle member on said actuating member, and clutch means connecting said handle member to said actuating member and in disengaged relation affording relative rotation between said handle member and said actuating member but responsive to limited relative longitudinal movement of said members for effecting an interlock enabling turning of said actuating member by turning of said handle member, said clutch means comprising an annular groove formed in one of said members and extending through 360° and having a flat extending from and intersecting with said groove, and the other of said members having an abutment for arcuate movement along said groove in disengaged relation of said clutch means and for engagement with said flat upon longitudinal shifting of said members.

5. In a brake lever structure, a reciprocal and rotary member having a generally cylindrical rear end portion, means for retaining said member in brake setting position against return to brake releasing position, said means being releasable by turning said member, a handle having a tubular portion embracing said cylindrical rear end portion with the rear end portion fitting closely in a longitudinal bore in said tubular handle portion, a pin extending transversely of said tubular portion and generally tangentially of said cylindrical rear end portion and projecting into said bore, said member having an annular groove receiving said pin in normal position of said handle relative to said member and having a flat extending from said groove in the rearward direction and disposed in a generally tangential plane to receive said pin therealong upon retraction of said handle relative to said member, and spring means urging said handle forwardly relative to said member.

6. In a brake lever structure, a reciprocal and rotary member having a generally cylindrical rear end portion, means for retaining said member in brake setting position against return to brake releasing position, said means being releasable by turning said member, a handle having a tubular portion embracing said cylindrical rear end portion with the rear end portion fitting closely in a longitudinal bore in said tubular handle portion, a pin extending transversely of said tubular portion and projecting into said bore, said member having an annular groove extending completely around the periphery of said member receiving said pin in normal longitudinal position of said handle relative to said member and having a flat extending from said groove in the rearward direction and disposed to receive said pin therealong upon retraction of said handle relative to said member, spring means urging said handle forwardly relative to said member, and a button fixed to the rear end of said member and affording at its forward end an abutment surface for said spring means and at its rear end a fulcrum for receiving the thumb of the operator in retracting the handle relative to the member.

7. In combination in a brake actating assembly, a supporting structure, an elongated actuating member carried by said supporting structure and having means on one end portion for operative attachment to a brake system, said member being longitudinally reciprocable relative to said structure for brake setting and release purposes, cooperating means on said supporting structure and on said member for retaining said member in brake setting positions relative to the supporting structure, said member being turnable about its longitudinal axis for releasing said cooperating means, a handle reciprocably mounted on the opposite end portion of said member, said handle being swingable relative to said member in one reciprocal position of the handle on the member, yieldable biasing means normally urging the handle into said one reciprocal position, and means operative as an incident to movement of the handle from said one position into a second position in normal angular orientation thereof and in opposition to said biasing means in response to manually applied force for effecting an interconnection of the handle and said member to turn the member by swinging of the handle while in said second position for releasing said cooperating means to enable longitudinal movement of said member toward brake-releasing position, said handle in said one reciprocal position being swingable relative to said member in both directions from normal angular orientation.

8. In a straight pull brake lever structure, a reciprocally and rotatably movable member, means for retaining said member in brake setting position against return to brake releasing position, said means being releasable by turning said member, a handle on said member, and clutch means connecting said handle to said member and in disengaged position affording rotation of said handle relative to said member in both directions but responsive to limited movement longitudinally relative to said member for effecting an interlock enabling turning of said member by turning of the handle, said clutch means comprising a flat on said member disposed in a generally tangential plane and constraining said handle against rotation upon longitudinal movement of the handle relative to said member.

9. In a brake lever structure, a reciprocal and rotary movable member having a generally cylindrical rear end portion, means for retaining said member in brake setting position against return to brake releasing position, said means being releasable by turning said member, a handle having a tubular socket portion embracing said cylindrical rear end portion with the rear end portion fitting closely in a longitudinal bore in said tubular handle portion, a pin extending transversely of said tubular portion and projecting into said bore, said member having an annular groove receiving said pin in normal longitudinal position of said handle on said member and having a flat extending from said groove in the rearward direction and disposed to receive said pin therealong upon retraction of said handle relative to said member, the pin extending tangentially to said annular groove, said handle tubular portion having a first longitudinal bore extending therethrough and having an enlarged counterbore extending from the rear end thereof forwardly to a shoulder, spring means within said counterbore and seated against said shoulder, and a button of generally cylindrical form relatively reciprocal in said counterbore and having a forward edge providing an abutment for the rear end of said spring means and providing a rear end for engagement by the thumb of an operator in retracting said handle to engage the handle with the member.

References Cited in the file of this patent

UNITED STATES PATENTS

| | | |
|---|---|---|
| 1,942,273 | Bosworth et al. | Jan. 2, 1934 |
| 2,273,334 | Shakespeare | Feb. 17, 1942 |
| 2,329,859 | Snell | Sept. 21, 1943 |
| 2,631,470 | Sandberg | Mar. 17, 1953 |
| 2,666,339 | Schwarz | Jan. 19, 1954 |